No. 704,612. Patented July 15, 1902.
B. BUTLER.
HAND CART.
(Application filed Apr. 10, 1902.)
(No Model.) 2 Sheets—Sheet 1.
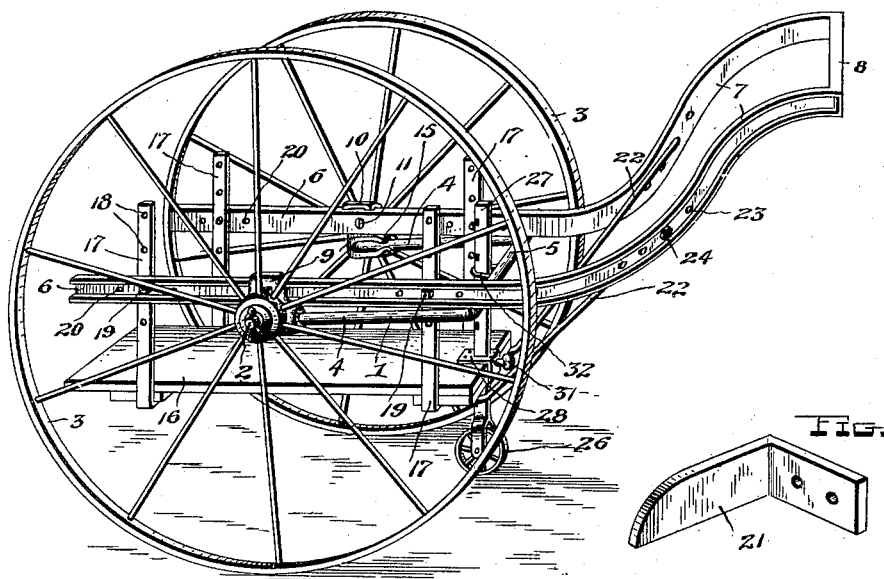
Fig. 1
Fig. 10
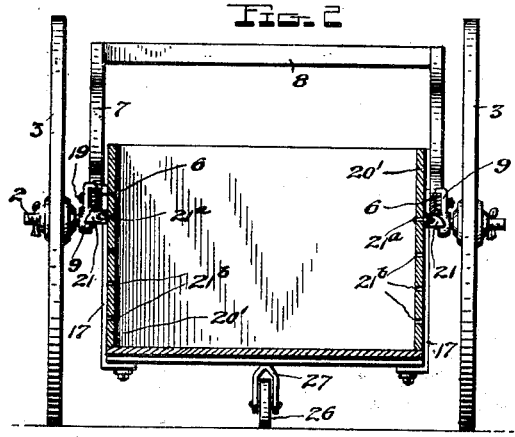
Fig. 2
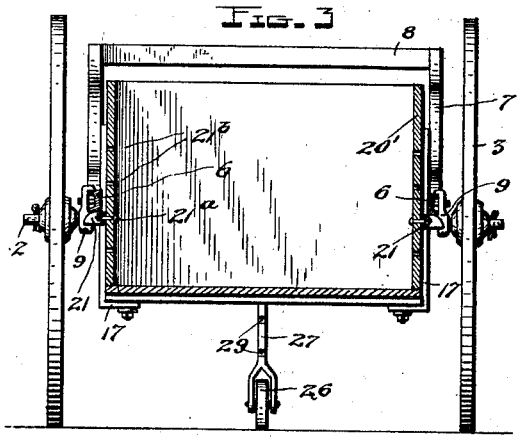
Fig. 3
Witnesses
Inventor
Bert Butler
By H. B. Willson & Co.
Attorneys No. 704,612. Patented July 15, 1902.
B. BUTLER.
HAND CART.
(Application filed Apr. 10, 1902.)
(No Model.) 2 Sheets—Sheet 2.
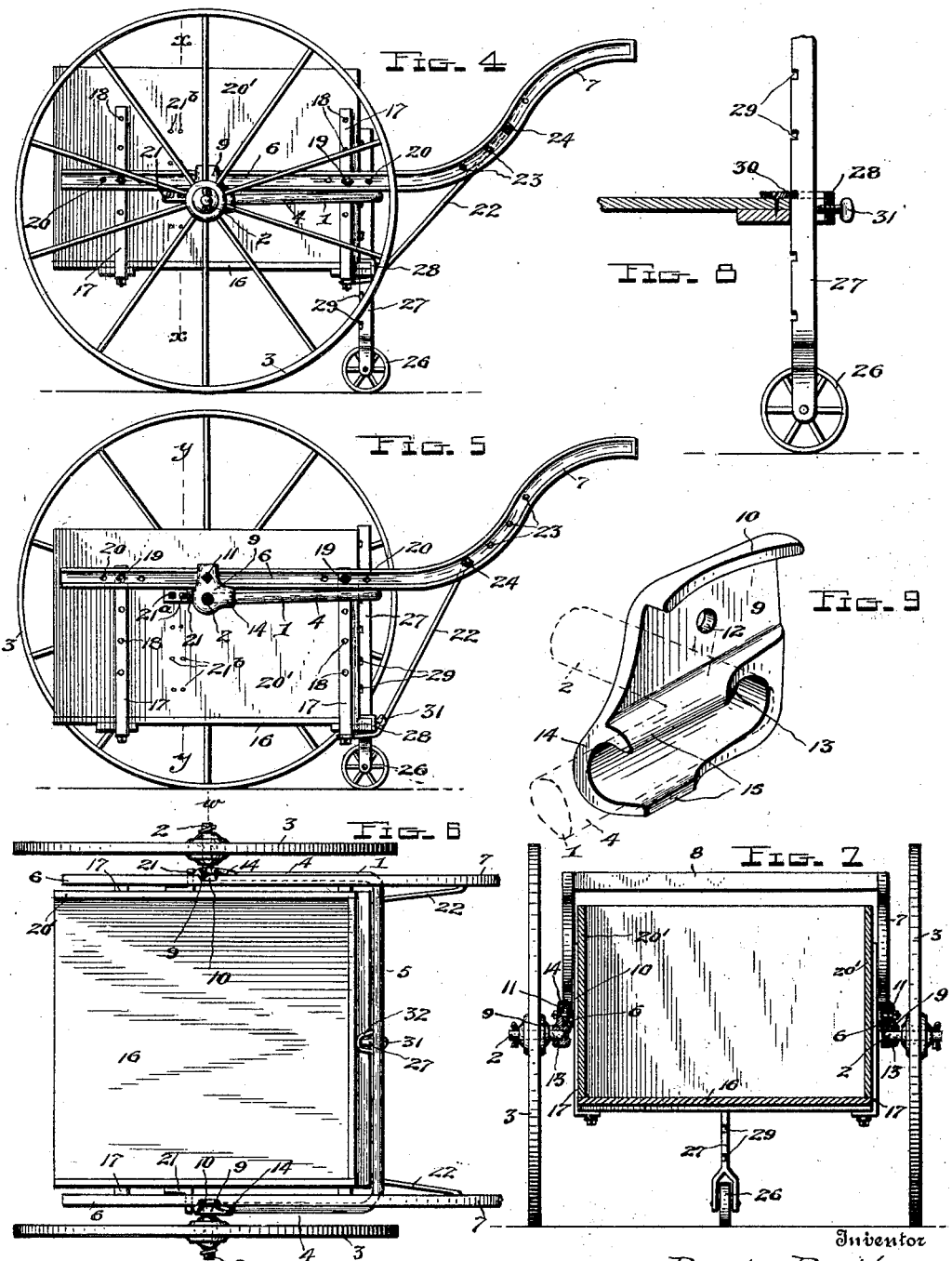
Inventor
Bert Butler

UNITED STATES PATENT OFFICE.

BERT BUTLER, OF KENSETT, IOWA.

HAND-CART.

SPECIFICATION forming part of Letters Patent No. 704,612, dated July 15, 1902.

Application filed April 10, 1902. Serial No. 102,224. (No model.)

*To all whom it may concern:*

Be it known that I, BERT BUTLER, a citizen of the United States, residing at Kensett, in the county of Worth and State of Iowa, have invented certain new and useful Improvements in Hand-Carts; and I do declare the following to be a full, clear, and exact description of the invention, such as will enable others skilled in the art to which it appertains to make and use the same.

The invention relates to hand-carts.

The object of the invention is to improve the construction shown in my Patents Nos. 666,733 and 675,541, dated, respectively, January 29, 1901, and June 4, 1901, by simplifying the construction and producing a more substantial and easily-operated cart which has a wide range of adjustment to suit the various purposes for which it is used.

With this and other objects in view the invention consists of certain novel features of construction, combination, and arrangement of parts, which will be hereinafter more fully described, and particularly pointed out in the appended claims.

In the accompanying drawings, Figure 1 is a perspective view of my improved cart with the side and end boards removed. Fig. 2 is a cross-sectional view on line $xx$ of Fig. 4. Fig. 3 is a similar view on line $yy$ of Fig. 5. Fig. 4 is a side elevation of the cart with its sideboards in position and showing the platform adjusted a considerable distance from the ground. Fig. 5 is a similar view with the supporting-wheel removed, showing the platform adjusted to its lowermost position. Fig. 6 is a top plan view with one of the end boards removed. Fig. 7 is a cross-sectional view through line $ww$ of Fig. 6. Fig. 8 is a sectional view through the platform, illustrating the manner of securing the caster-wheel vertically adjustable to the platform of the cart. Fig. 9 is a detail perspective view of the axle-bracket, and Fig. 10 is a similar view of one of the side-board brackets.

In the drawings, 1 denotes a horizontally-disposed crank-axle, upon the laterally-projecting ends 2 of which are mounted the main supporting-wheels 3. The sides 4 of the axle project rearwardly and are connected by the cross-piece 5 of said axle. It will thus be seen that the axle can be made of a single bar or rod.

6 denotes side bars, preferably made of channel-iron and terminating at their rear ends in handles 7, provided with a cross grip or bar 8. The side bars, handles, and cross bar or grip may be made from a single piece of metal bent to shape, as shown. The side bars lie in a plane above that of the side pieces 4 of the axle, and these side bars 6 and side pieces 4 are connected together by axle-brackets 9, as more clearly shown in Figs. 5 and 9 of the drawings. Each bracket is provided with a hook or flange 10, which engages the upper edge of the side bars and is secured to the said side bar by a bolt 11, which passes through a hole 12, formed in said bracket. The bracket is also provided with an aperture 13, through which the stub ends 2 of the axle project, and with an extension 14, having lips 15 to receive a portion of the side pieces 4 of the axle and capable of being firmly clamped to said side pieces when the parts are assembled by bending or pressing the lips toward each other, thus supporting the axle in its horizontal position, as well as bracing the stub ends thereof against spreading.

16 denotes a platform, and 17 denotes hangers having vertical rows of apertures 18, which are adapted to receive bolts 19 for vertically adjusting the platform to the side bars. These side bars are provided with horizontal rows of apertures 20, whereby the platform may also be adjusted longitudinally the length of the side bars as well as vertically. In other words, the platform has a vertical as well as a longitudinal adjustment with respect to the side bars.

20' denotes side-boards provided with hooks 21 for engaging the under edges of the side bars to connect the said boards thereto when it is desired to use the same. These hooks are vertically adjustably secured by bolts 21$^a$ in apertures 21$^b$, formed in the side-boards, so that the hooks may be adjusted vertically in accordance with the vertical adjustment of the platform.

22 denotes braces the lower ends of which are formed with eyes and are bolted to the platform at its rear end, and the upper ends of which extend through apertures 23 in the handles 7. It is evident that when the platform is adjusted vertically the nuts 24 on the ends of these braces will be unscrewed, so as to adjust the braces in the apertures 23, as shown in Figs. 4 and 5.

If desired, I may provide the cart with a caster-wheel 26 for supporting the rear end of the cart. This wheel is journaled to a standard 27, which passes through a bracket 28, secured to the rear end of the platform and is formed with notches 29, which are engaged by the edge 30 of said bracket. A set-screw 31 is employed to lock the standard to the bracket after the platform has been adjusted the desired distance from the ground.

32 denotes a bail or loop secured to the portion 5 of the axle, and through this bail or loop projects the upper end of the standard 27, thus steadying said standard in its connection with the cart.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with an axle and wheels journaled thereon, of side bars fixed to said axle and extending in approximately the same horizontal plane, and a platform vertically and longitudinally adjustably connected to said side bars, substantially as set forth.

2. The combination with the axle and its supporting-wheels, of side bars connected to said axle, hangers adjustably connected to said side bars, a platform supported by said hangers, side-boards, and brackets adjustably connected to said side-boards for engaging the side bars and holding the side-boards in proper position, substantially as set forth.

3. The combination with a U-shaped axle lying in substantially a horizontal plane and provided with stubs at its ends, of wheels journaled on said ends, a loop or bail secured to the cross-piece of said axle, side bars fixed to said axle, a platform connected to said side bars, a bracket, a standard extending through said bracket and loop, a caster-wheel carried by the lower end of the standard, means for adjusting the platform, and means for locking it in adjusted position with respect to the standard, substantially as set forth.

In testimony whereof I have hereunto set my hand in presence of two subscribing witnesses.

BERT BUTLER.

Witnesses:
   CHAS. J. FORSBERG,
   JOHN W. HURD.